United States Patent
Le Pors et al.

(10) Patent No.: US 9,983,762 B2
(45) Date of Patent: May 29, 2018

(54) METHOD FOR ADJUSTING A VIEWING/MASKING SECTOR OF AN ENVIRONMENT SCANNING DEVICE, AND CORRESPONDING ADJUSTING DEVICE AND OPERATOR TERMINAL

(71) Applicant: THALES, Neuilly sur Seine (FR)

(72) Inventors: Eric Le Pors, Elancourt (FR); Pierre Laborde, Elancourt (FR); Olivier Grisvard, Elancourt (FR); Yannick Mahias, Elancourt (FR)

(73) Assignee: Thales, Neuilly sur Seine (FR)

( * ) Notice: Subject to any disclaimer, the term of this patent is extended or adjusted under 35 U.S.C. 154(b) by 197 days.

(21) Appl. No.: 14/742,512

(22) Filed: Jun. 17, 2015

(65) Prior Publication Data

US 2015/0286366 A1    Oct. 8, 2015

Related U.S. Application Data (63) Continuation of application No. PCT/EP2013/076929, filed on Dec. 17, 2013.

(30) Foreign Application Priority Data

Dec. 18, 2012 (FR) .................................... 12 03458

(51) Int. Cl.
*G06F 3/0481* (2013.01)
*G06F 3/0488* (2013.01)
(Continued)

(52) U.S. Cl.
CPC ............ *G06F 3/04815* (2013.01); *G01S 7/04* (2013.01); *G01S 7/043* (2013.01); *G01S 7/24* (2013.01);
(Continued)

(58) Field of Classification Search
CPC . G01S 13/02; G01S 7/04; G01S 7/043; G01S 7/24; G01S 7/51;
(Continued)

(56) References Cited

U.S. PATENT DOCUMENTS 4,706,090 A * 11/1987 Hashiguchi ............... G01S 7/06
342/182
5,179,385 A *  1/1993 O'Loughlin ........... G01C 21/00
342/176

(Continued)

FOREIGN PATENT DOCUMENTS

EP           1640740 A2    3/2006
EP           1640740 A3    9/2006
WO    WO 2012/021923 A1   2/2012

OTHER PUBLICATIONS

Fouts et al., Synthetic apearature radar data visualization on the iPod Touch, Proceedings of SPIE, vol. 7699, Apr. 15, 2010.

(Continued)

*Primary Examiner* — Patrick Edouard
*Assistant Examiner* — Peijie Shen
(74) *Attorney, Agent, or Firm* — Knobbe, Martens, Olson & Bear, LLP (57) ABSTRACT

A method of adjusting a viewing/masking sector of an environment scanning device, and a corresponding adjusting device and operator terminal are disclosed. In one aspect, the method includes activating a phase of operator adjustment of the parameters, to show, on the information display, an angular viewing/masking sector of the scanning device having radii indicating the central axis orientation and the lateral edges of the angular viewing/masking sector, and touch-sensitive interactive zones configured to be angularly moved by the operator in order to set the corresponding parameters of the environment scanning device. The method further includes adjusting the orientation and aperture of the (Continued)

angular viewing/masking sector based on a touch-sensitive interaction between the operator and the corresponding interactive zones and moving at least one of the corresponding radii toward at least one new adjustment position.

19 Claims, 4 Drawing Sheets

(51) Int. Cl.
  *G06F 3/0484* (2013.01)
  *G01S 13/02* (2006.01)
  *G01S 7/04* (2006.01)
  *G01S 7/24* (2006.01)
  *G01S 7/51* (2006.01)

(52) U.S. Cl.
  CPC ............... *G01S 7/51* (2013.01); *G01S 13/02* (2013.01); *G06F 3/0488* (2013.01); *G06F 3/04845* (2013.01); *G06F 2203/04804* (2013.01)

(58) Field of Classification Search
  CPC ....... G06F 2203/04804; G06F 3/04815; G06F 3/04845; G06F 3/0488
  See application file for complete search history.

(56) References Cited

U.S. PATENT DOCUMENTS

| | | | | |
|---|---|---|---|---|
| 5,494,040 | A * | 2/1996 | Nakao | A61B 8/12 600/463 |
| 6,063,030 | A * | 5/2000 | Vara | A61B 8/00 600/437 |
| 6,774,818 | B1 * | 8/2004 | Alfredsson | G01S 7/10 340/971 |
| 7,932,853 | B1 * | 4/2011 | Woodell | G01S 7/10 342/26 B |
| 8,994,578 | B1 * | 3/2015 | Finley | G01S 13/953 342/179 |
| 9,019,147 | B1 * | 4/2015 | Oranskiy | G01S 7/14 342/26 R |
| 9,057,773 | B1 * | 6/2015 | Fersdahl | G01S 13/953 |
| 2002/0027513 | A1 * | 3/2002 | Suzuki | G01S 7/064 340/990 |
| 2002/0087061 | A1 * | 7/2002 | Lifshitz | A61B 5/00 600/407 |
| 2003/0013959 | A1 * | 1/2003 | Grunwald | A61B 8/08 600/437 |
| 2003/0043058 | A1 * | 3/2003 | Jamieson | G01C 23/005 340/961 |
| 2007/0075915 | A1 * | 4/2007 | Cheon | G06F 1/1616 345/1.1 |
| 2010/0145195 | A1 | 6/2010 | Hyun | |
| 2010/0287195 | A1 * | 11/2010 | Geurts | G06F 17/30241 707/769 |
| 2010/0321324 | A1 * | 12/2010 | Fukai | A61B 8/00 345/173 |
| 2011/0032140 | A1 * | 2/2011 | Breban | G01S 7/14 342/179 |
| 2012/0274660 | A1 * | 11/2012 | Okuda | G01S 7/04 345/629 |
| 2013/0009808 | A1 * | 1/2013 | Hering | G01S 7/24 342/26 B |
| 2014/0043185 | A1 * | 2/2014 | Quellec | G01S 7/2926 342/146 |
| 2014/0062756 | A1 * | 3/2014 | Lamkin | G08G 5/0021 342/29 |
| 2014/0071063 | A1 * | 3/2014 | Kuscher | G06F 3/041 345/173 |
| 2015/0033326 | A1 * | 1/2015 | Fang | G06F 3/04842 726/16 |
| 2015/0194060 | A1 * | 7/2015 | Mannon | G08G 5/0078 701/301 |
| 2015/0360566 | A1 * | 12/2015 | Bas Gago | G01W 1/10 340/971 |

OTHER PUBLICATIONS

International Search Report dated Apr. 11, 2014 for Intl. Patent Application No. PCT/EP2013/076929 filed Dec. 17, 2013.

* cited by examiner

METHOD FOR ADJUSTING A VIEWING/MASKING SECTOR OF AN ENVIRONMENT SCANNING DEVICE, AND CORRESPONDING ADJUSTING DEVICE AND OPERATOR TERMINAL

CROSS-REFERENCE TO RELATED APPLICATIONS

This application is a continuation of International Application No. PCT/EP2013/076929, filed Dec. 17, 2013, which claims benefit under 35 U.S.C. § 119 of French Application No. 12 03458, filed Dec. 18, 2012, which are herein incorporated by reference in their entirety.

BACKGROUND

Technological Field

The described technology generally relates to a method for adjusting parameters of at least orientation and aperture of an angular viewing/masking sector of an environment scanning device, integrated into a mission system.

Description of the Related Technology

Such a system may be associated with a carrier, such as an aircraft, or any other type of carrier.

The described technology also generally relates to an adjusting device and an operator terminal for a corresponding viewing system.

More particularly, the described technology generally relates to processes and methods for man/machine interaction for example adapted to the configuration of mission systems in difficult and restrictive environments, for example in the airport or naval field.

These environments are in fact characterized by significant movements of the wearer, vibrations, relatively high noise, limited brightness, etc., i.e., conditions making the use the systems fairly difficult and delicate and requiring considerable vigilance from the operator.

Such a device for scanning the environment in such a mission system for example includes a radar associated with the carrier and then also includes an operator terminal further comprising a display capability for displaying information and an adjusting capability for adjusting parameters, in particular for orientation and aperture of an angular viewing/masking sector thereof.

The sector is for example the sector that is scanned or, on the contrary, not scanned by the radar beam of an aircraft.

Of course, other applications may be considered.

This angular viewing/masking sector of such a scanning device is generally a sector whose central part is geocentered, on the position of the carrier for which one wishes to depict a scanning zone.

This scanning zone may be limited by a distance, a direction and an aperture angle, for example around an aircraft.

Practically speaking, this sector may for example relate to a scanning sector or a masking sector of the radar, determined by an operator as a function of the needs of the mission using a corresponding adjusting capability provided to the operator in the corresponding terminal.

In a terminal of the state of the art, the adjusting capability for adjusting the orientation and aperture parameters of this angular sector for example comprise an adjusting panel or table including a portion displaying the orientation of the angular sector for example associated with buttons or touch-sensitive interaction zones with an operator, allowing the operator to adjust the orientation of that sector by incrementing/decrementing the displayed orientation angle.

The adjusting panel or table of that terminal of the state of the art also includes another display portion for the aperture of the angular sector.

That other display portion is also associated with buttons or touch-sensitive interaction zones with the operator, allowing the latter to adjust that aperture here again by incrementing/decrementing the displayed value using the control capability provided to him.

A button or a touch-sensitive interaction zone with the operator to validate the new entered parameters may also be provided on this table or panel of the terminal to end the adjusting operations.

One can, however, see that such a structure has a certain number of drawbacks inasmuch as the adjustment of the parameters requires a large number of interactions between the operator and the terminal and sustained attention by the operator.

These problems become even more significant when the type of mission systems in question may be integrated, as previously indicated, into carriers subject to very strong outside constraints, which disrupts the operator accordingly.

Another problem lies in the fact that the information display capability and the adjusting capability may be remote from one another, which does not make it easier to perceive the adjustments done by the operator.

SUMMARY OF CERTAIN INVENTIVE ASPECTS

One objective of some aspects is therefore to resolve these problems.

To that end, one inventive aspect relates to a method of adjusting the parameters at least regarding the orientation and aperture of an angular viewing/masking sector of an environment scanning device, integrated into the mission system, and geocentered around a carrier of that device, comprising an operator terminal further comprising an information display capability and an adjusting capability for adjusting these parameters by the operator, wherein the method comprises: a step of activating a phase of operator adjustment of the parameters, to show, on the information display capability, on the one hand, the current angular viewing/masking sector of the scanning device with its radii indicating the central axis orientation and the lateral edges of the sector, and on the other hand, touch-sensitive interactive zones whereby the operator can angularly move these radii in order to set the corresponding parameters of the scanning device, a step of adjusting the orientation and aperture of the angular viewing/masking sector of the scanning device by a touch-sensitive interaction between the operator and the corresponding interactive zones and moving the corresponding radii toward their new adjustment position, and a step of validating the adjustments made by the operator and corresponding programming of the scanning device.

According to other aspects, considered alone or in combination: the viewing/masking sector of the device is displayed superimposed on the rest of a tactical situation displayed around the carrier on the information display capability; the sector is displayed at a different scale from that of the rest of the tactical situation during the adjusting phase; the touch-sensitive interaction step of the operator with the interactive zones is carried out via a touch-sensitive tablet associated with the display capability; the touch-sensitive interaction step of the operator with the interactive zones is carried out via a touch-sensitive screen also constituting the display capability; the orientation of the sector is defined relative to geographic North; the orientation of the sector is defined relative to the movement axis of the carrier; the touch-sensitive interactive zones are embodied by interactive circles at the ends of the radii; a touch-sensitive zone is associated with the radius indicating the central axis of orientation of the sector to allow the operator to adjust the latter and at least one of the radii indicating the lateral edge of the sector to allow the operator to adjust the aperture of the sector; a touch-sensitive interactive zone is associated with each lateral edge radius to make it possible to adjust the aperture of the sector; the touch-sensitive interactive zone associated with the radius indicating the central orientation axis of the sector has a different color from that of the touch-sensitive interactive zone associated with the or each radius indicating the lateral edges of the sector; the adjustment of the orientation of the sector is obtained by selecting the touch-sensitive zone associated with the radius indicating the central axis of orientation of the sector and angular movement thereof by the operator in order to adjust the orientation of the sector accordingly; the adjustment of the orientation of the sector is obtained by selecting touch-sensitive zones associated with the radii indicating the lateral edges of the sector and simultaneous angular movement of the latter by the operator in order to adjust the orientation of the sector accordingly; the adjustment of the aperture of the sector is obtained by selecting the touch-sensitive zone associated with a corresponding radius indicating the lateral edge of the sector and angular movement of the latter by the operator in order to adjust the aperture of the sector accordingly; the adjustment of the aperture of the sector is obtained by selecting the touch-sensitive zone associated with the radius indicating the axis of central orientation of the sector and the touch-sensitive zone associated with a corresponding radius indicating the lateral edge of the sector and relative angular movement of the latter by the operator in order to adjust the aperture of the sector accordingly; the adjustment of the aperture of the sector is obtained by selecting touch-sensitive zones associated with the radii indicating the corresponding lateral edges of the sector and relative angular movement of the latter by the operator in order to adjust the aperture of the sector accordingly.

Another aspect is a device for adjusting parameters at least regarding the orientation and aperture of an angular viewing/masking sector of an environment scanning device, integrated into a mission system, and geocentered around the carrier of that device, comprising a capability for carrying out an adjusting method as previously described.

Another aspect is an operator terminal of a mission system including at least one environment scanning device and one adjusting device as previously described.

According to other aspects of this terminal considered alone or in combination: the scanning device includes at least one element selected from the following group: a radar, a camera, a detector; it is onboard a carrier selected from the following group: a stationary station, a land vehicle, a ship; an aircraft.

BRIEF DESCRIPTION OF THE DRAWINGS

The described technology will be better understood using the following description, provided solely as an example and done in reference to the appended drawings, in which.

DETAILED DESCRIPTION OF CERTAIN INVENTIVE EMBODIMENTS

As previously indicated, the described technology generally relates to a method for adjusting parameters at least regarding the orientation and aperture of an angular viewing/masking sector of an environment scanning device, for example integrated into a mission system and here centered around a carrier of that device.

Figure 1:
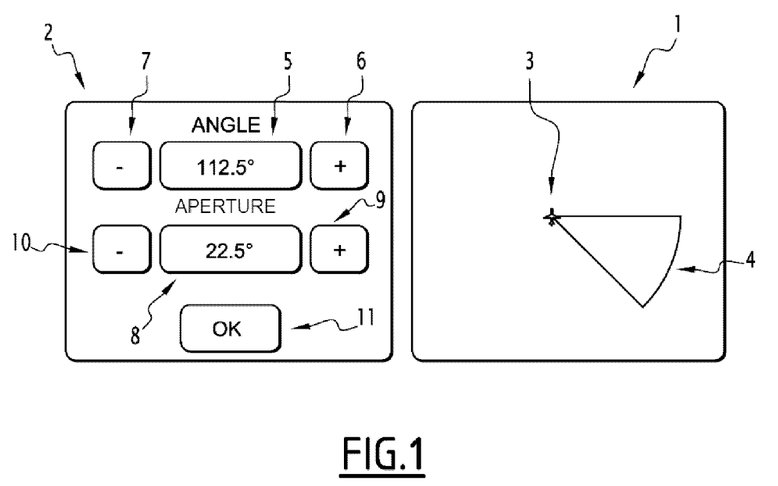
FIG. 1 shows a block diagram illustrating the structure and operation of an operator terminal of a mission system of the state of the art.

This mission system may for example be a mission system implementing an onboard radar, for example onboard an aircraft, as illustrated in FIG. 1.

Of course, other sensors, such as cameras or others, may also be considered.

In that case, the mission system includes an operator terminal further comprising an information display capability for displaying information designated by general reference 1 in this FIG. 1, and an adjusting capability for adjusting parameters at least regarding the orientation and aperture of the scanning device, by the operator, the adjusting capability being designated by general reference 2.

As illustrated in this FIG. 1, the information display capability 1 is then suitable for showing the carrier of the scanning device, such as the aircraft designated by general reference 3, and illustrating the angular viewing/masking sector of the scanning device carried by the latter, that sector being designated by general reference 4 in this FIG. 1.

The adjusting capability for adjusting by the operator of the orientation and aperture parameters of the angler sector of this device then in fact for example includes two display portions, including a first display portion for the orientation of the sector, designated by general reference 5 and associated with buttons touch-sensitive or zones, for example 6 and 7, allowing the operator to adjust the orientation angle.

These adjusting numbers are in fact for example members for incrementing/decrementing the orientation.

Likewise, a second display portion designated by general reference 8 allows the operator to know the aperture of the angular sector and act on the latter to adjust it using buttons or touch-sensitive adjusting zones 9 and 10 associated with that display portion.

These buttons or touch-sensitive zones also then allow the operator to increment/decrement that aperture.

A validation button or touch-sensitive zone 11 is for example also provided to allow the validation of the adjustments made by the operator and end the adjusting operations.

As previously indicated, this type of terminal has a certain number of drawbacks.

Figure 2:
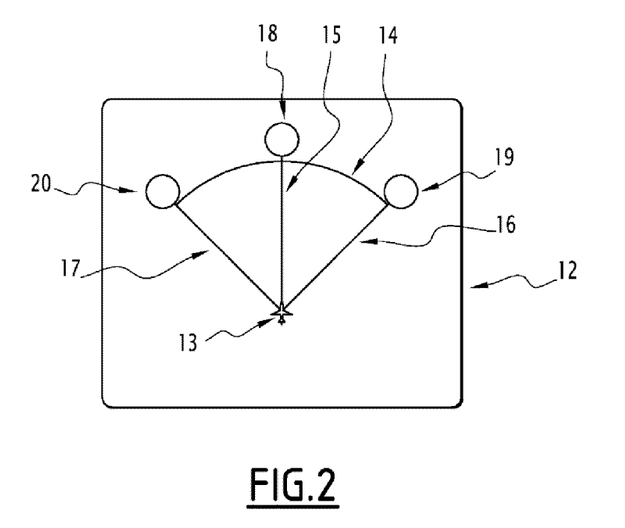
FIG. 2 illustrates an example embodiment of an adjusting method according to an embodiment, FIG. 3 diagrammatically shows an example embodiment of an operator terminal of a mission system according to an embodiment.
Figure 3:
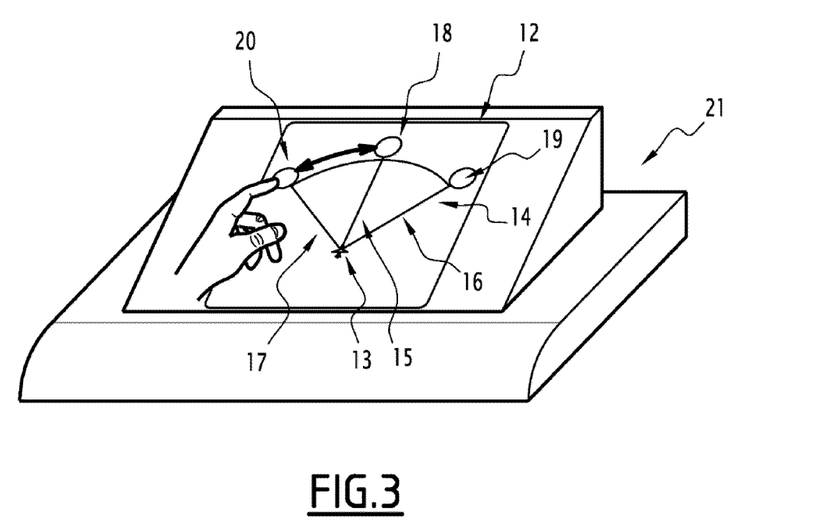

To resolve these problems and as illustrated in FIG. 2, certain embodiments include an adjusting method that includes a step for activating a phase for adjustment of the parameters by the operator, to show, on the information display capability designated by general reference 12 in FIG. 2, on the one hand, the current angular viewing/masking sector of the scanning device, with the radii of the central axis and lateral edges of the sector, and on the other hand, touch-sensitive interaction zones with the operator, for angular movement of those radii by the operator, to adjust the corresponding parameters of the scanning device.

Thus, for example, on the information display capability 12 illustrated in this FIG. 2, the carrier of the scanning device, for example an aircraft, is designated by general reference 13, and the angular viewing/masking sector of the scanning device thereof is designated by general reference 14.

During the phase for adjusting the orientation and aperture parameters thereof, this angular sector 14 is then shown on the information display capability 12, with its radius indicating the central axis of orientation designated by general reference 15 and its radii indicating the lateral edge designated by general references 16 and 17, respectively, in this figure.

This then makes it possible for the operator to see this sector easily, by showing it for example using one or more display features different from the rest of the tactical situation displayed on the display capability.

Thus for example, different colors, scales, display modes (for example, fixed or blinking), etc., may be used to highlight the sector.

Furthermore, touch-sensitive interactive zones for angular movement of these radii by the operator are also shown, to allow that operator to adjust the corresponding parameters of the scanning device easily and as naturally as possible.

It in fact suffices, for example, for the operator to place a finger on such a zone and move it by moving his finger to adjust the position of the radius, and therefore of the corresponding axis, and to move it from a current position to a new adjusted position and to steer/control the scanning device accordingly.

The touch-sensitive interactive zone associated with the central axis of orientation of the sector is designated by general reference 18, while the touch-sensitive interactive zones associated with the axes of lateral edges of the sector are designated by references 19 and 20, respectively, in this FIG. 2.

As illustrated, the zones are for example embodied by circles having particular display characteristics allowing the operator to see them very easily.

This is of course only one possible example embodiment.

One can then see, as illustrated in FIGS. 3 to 11, in which the display capability 12 previously described and integrated into an operator terminal 21 of the mission system can be seen, that the adjustment of the orientation and aperture of the viewing/masking angular sector of the scanning device is done by touch-sensitive interaction between the operator and the corresponding interactive zones, simply by pressing one of the operator's fingers on a zone and moving it, and therefore a corresponding radius, toward its new adjusted position, to control an adjustment of the scanning device accordingly, i.e., for example, a radar carried by the aircraft.

Once the new adjustment is obtained, it is then possible to validate it and to steer/program that scanning device accordingly so that the latter works on the new defined sector.

In the example illustrated in different figures, the touch-sensitive interactive zones are displayed on a touch-sensitive screen also simultaneously making up the information display capability.

This makes it possible to simplify the interactions between the operator and the rest of the terminal, but of course other embodiments of this terminal may be considered.

Thus, for example, a touch-sensitive tablet or any other equivalent device may also be incorporated in the operator terminal in combination with the display capability while being separate therefrom.

The orientation of the angular sector of the scanning device may be defined relative to geographic North or relative to the movement axis of the carrier, as illustrated.

The touch-sensitive interactive zones as designated by references 18, 19 and 20 may be embodied in different ways in the display capability, for example by circles or another circular or noncircular pad, for interaction with the operator, and have different display characteristics, for example different colors, from the rest of the display information, allowing the operator to see those interactive zones and their function as quickly and easily as possible.

In the illustrated example, a touch-sensitive zone 18 is associated with the end of the radius indicating the central axis of orientation of the sector to allow the operator to adjust the latter and a touch-sensitive interactive zone 19 and 20 is associated with the end of each radius indicating a lateral edge of that sector to allow the operator to adjust the aperture of the sector.

Of course, other embodiments may be considered, a single touch-sensitive interactive zone being able to be provided in combination with only one of the lateral edge radii of the sector, to allow the operator to adjust the aperture thereof by for example acting on a single interaction zone.

Figure 4:
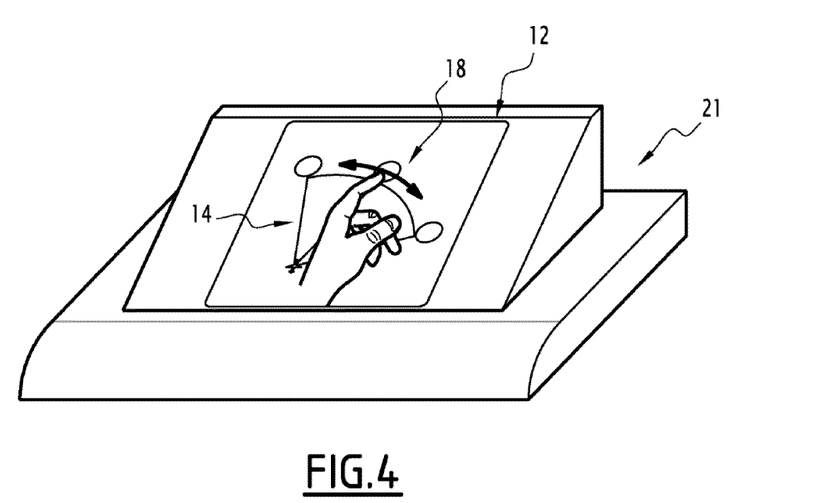
FIGS. 4 to 11 show adjusting sequences illustrating the adjustments done using a device according to an embodiment.

Thus, for example, the adjustment of the orientation of the sector may be obtained as illustrated in FIG. 4, by selection by the operator by placing a finger, for example, in the touch-sensitive zone associated with the radius indicating the central axis of orientation of the sector, i.e., the touch-sensitive zone 18 associated with the radius 15.

The angular movements thereof by the operator then allow the operator to adjust the orientation of the angular sector accordingly to in fact control the operation of the scanning device.

Other embodiments may be considered.

Thus for example, the adjustment of the orientation of the sector may also be obtained by simultaneously selecting two touch-sensitive interactive zones associated with the radii of the lateral edges of the sector by the operator.

Simultaneous angular movements similar thereto by the operator then for instance allow him to adjust the orientation of the sector accordingly.

Other embodiments may also be considered.

The adjustment of the aperture of the sector may be obtained by selecting the touch-sensitive zone associated with a corresponding radius indicating the lateral edge of the sector and angular movement thereof by the operator, so as to adjust the aperture of the sector accordingly.

This is for example the case when a single lateral edge radius of the sector is associated with a single touch-sensitive interactive zone.

In that case, the movement of that zone, and therefore of that edge radius, by the operator results in a corresponding or non-corresponding movement, for example symmetrical and opposite, of the other edge radius so as to adjust the aperture of that sector.

Figure 5:
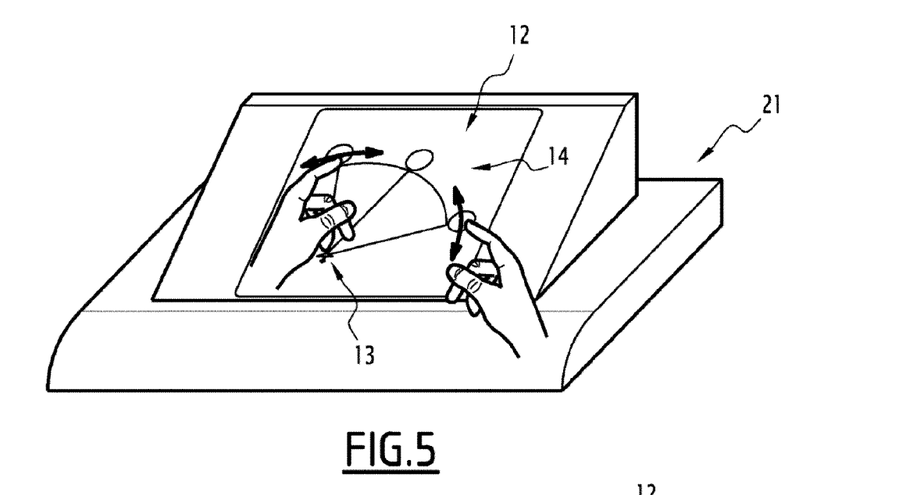
Figure 6:
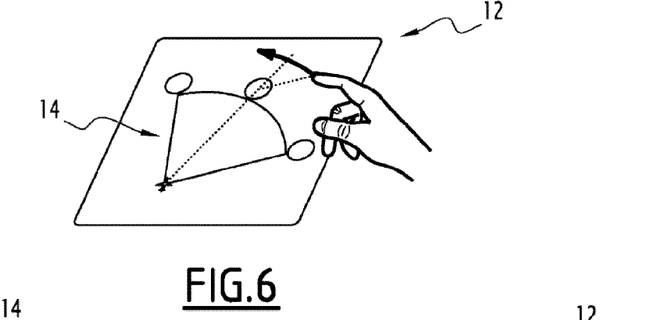
Figure 7:
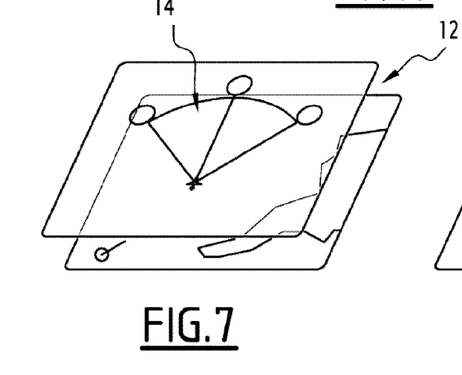
Figure 8:
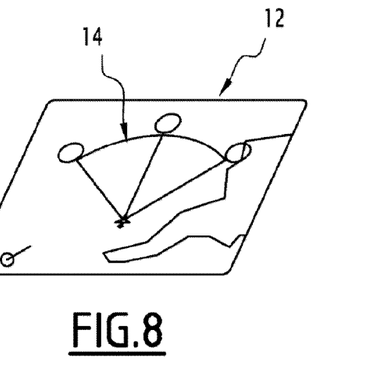
Figure 9:
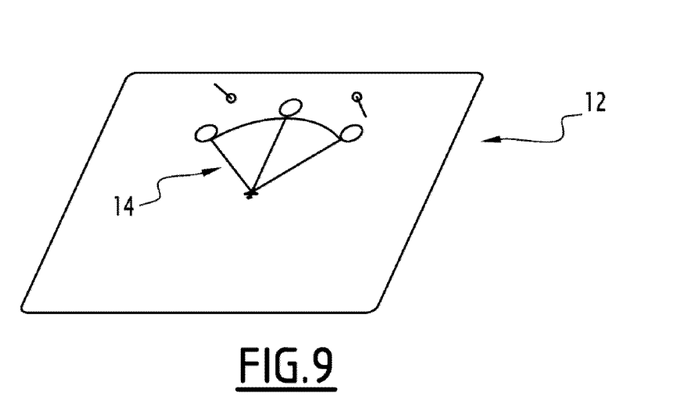

Of course, other embodiments may be considered, for example like that illustrated in FIG. 5.

In this figure, the adjustment of the aperture of the sector is obtained by simultaneously selecting touch-sensitive zones 19 and 20 associated with the corresponding lateral edge radii of the sector and relative angular movement thereof by the operator, to bring them angularly closer or further away so as to adjust the aperture of the sector accordingly.

Indeed, the operator then selects the touch-sensitive interactive end zones of the lateral edge radii of the sector with two fingers on the same hand or with both hands, and brings those zones angularly closer together or further apart, to adjust the angular aperture of the sector of the scanning device.

Figure 10:
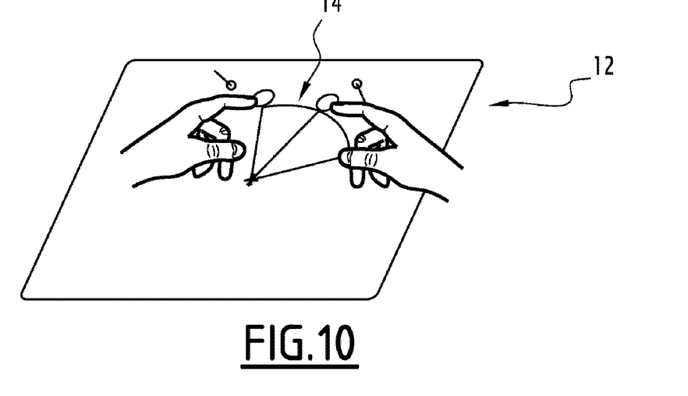
Figure 11:
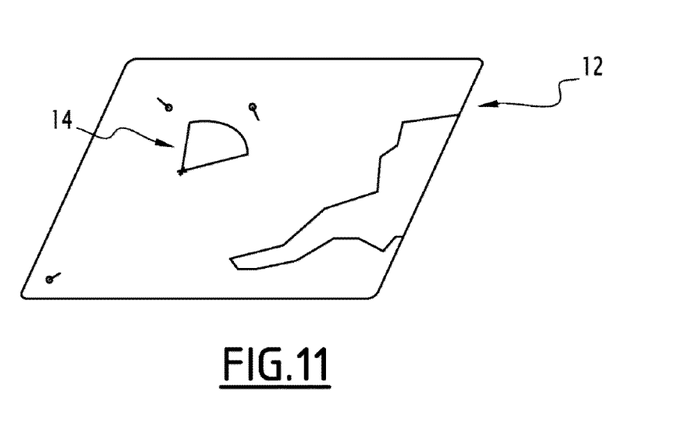

According to another possible embodiment illustrated in FIG. 10, the adjustment of the aperture of the sector is obtained by selecting the touch-sensitive zone associated with the radius indicating the central axis of orientation of the sector and the touch-sensitive zone associated with a lateral edge radius of that sector and by relative angular movement of those zones by the operator, so as to adjust the aperture of the sector accordingly.

Other manners of performing these adjustments may be considered.

FIGS. 8 to 11 also illustrate adjustment sequences for example applied by an environment scanning radar and onboard an aircraft moving in a predetermined geographical zone and tactical environment.

All of the information illustrating the situation, for example tactical situation, of the aircraft is for example viewed on the display capability of an operator terminal of the corresponding mission system.

One can then see that the phase for adjusting the parameters of the sector is activated, and the viewing/masking sector of the scanning device is displayed superimposed on the rest of a tactical situation displayed around the perimeter on the information display capability, as shown in these figures.

As also illustrated, during this phase, the sector may be displayed at a different scale from that of the rest of the tactical situation.

Of course, other different display features may also be used, for example different colors, blinking, etc.

This then makes it possible to highlight that data and facilitate the adjustment work by the operator.

As previously described, the adjusting method according to certain embodiments may be carried out to adjust parameters of an environment scanning device integrated into a mission system.

The scanning device may, as previously described, be a radar, but may also include at least one camera or sensors/detectors of different natures.

The carrier may then, as also previously described, be an aircraft, but it may also consist of a ship, land vehicle, or even a stationary station.

As can be appreciated by one of ordinary skill in the art, each of the modules or software of the program(s) can include various sub-routines, procedures, definitional statements, and macros. Each of the modules are typically separately compiled and linked into a single executable program. Therefore, any description of modules or software is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method of adjusting parameters at least regarding an orientation and aperture of an angular viewing/masking sector of an environment scanning device, integrated into a mission system, and geocentered around a carrier of the environment scanning device, the mission system comprising an operator terminal further comprising an information display and an adjusting capability for adjusting the parameters based on input received from the operator, the method comprising:

activating a phase of operator adjustment of the parameters, to show, on the information display:
 i) an angular viewing/masking sector of the scanning device having radii indicating a central axis orientation and lateral edges of the angular viewing/masking sector,
 ii) a first radius overlapping with an orientation of the central axis of the viewing/masking sector,
 iii) a second radius overlapping with one of the lateral edges of the angular viewing/masking sector,
 iv) a third radius overlapping with another one of the lateral edges of the angular viewing/masking sector,
 v) a first touch-sensitive interactive zone associated with the first radius,
 vi) a second touch-sensitive interactive zone associated with the second radius, and
 vii) a third touch-sensitive interactive zone associated with the third radius,
 wherein the first, second and third touch-sensitive interactive zones are configured to be angularly moved by the operator in order to change the respective position of the associated radii;

adjusting the orientation and aperture of the angular viewing/masking sector of the environment scanning device based on a touch-sensitive interaction between the operator and the first, second or third touch-sensitive interactive zones and moving at least one of the associated radii toward at least one new adjustment position; and validating the adjustments made by the operator and corresponding programming of the environment scanning device.

2. The method of claim 1, further comprising displaying the viewing/masking sector of the device superimposed on the rest of a tactical situation displayed around the carrier on the information display.

3. The method of claim 1, wherein the touch-sensitive interaction between the operator and the first, second or third interactive zones is carried out via a touch-sensitive tablet associated with the information display.

4. The method of claim 1, wherein the touch-sensitive interaction between the operator and the first, second or third interactive zones is carried out via a touch-sensitive screen included in the information display.

5. The method of claim 1, wherein the orientation of the viewing/masking sector is defined relative to geographic North.

6. The method of claim 1, wherein the orientation of the viewing/masking sector is defined relative to the movement axis of the carrier.

7. The method of claim 1, wherein the first, second and third touch-sensitive interactive zones are each represented by a circle displayed at the end of the associated radius.

8. The method of claim 1, wherein the first touch-sensitive interactive zone associated with the first radius is configured to allow the operator to adjust the orientation of the central axis of the viewing/masking sector, and at least one of the second and third interactive zones is configured to allow the operator to adjust the aperture of the viewing/masking sector.

9. The method of claim 8, wherein both of the second and third touch-sensitive interactive zones are configured to allow the operator to adjust the aperture of the viewing/masking sector.

10. The method of claim 1, wherein the first touch-sensitive interactive zone has a different color from that of the second and third touch-sensitive interactive zones.

11. The method of claim 1, wherein the adjusting of the orientation of the viewing/masking sector comprises i) selecting the first touch-sensitive interactive zone associated with the radius overlapping with the orientation of the central axis of the viewing/masking sector and ii) receiving angular movement of the first touch-sensitive interactive zone from the operator in order to adjust the orientation of the viewing/masking sector accordingly.

12. The method of claim 1, wherein the adjusting of the orientation of the viewing/masking sector comprises: i) selecting the second and third touch-sensitive interactive zones associated with the radii overlapping with the lateral edges of the viewing/masking sector and ii) receiving simultaneous angular movement of the second and third touch-sensitive interactive zones from the operator in order to adjust the orientation of the viewing/masking sector accordingly.

13. The method of claim 1, wherein the adjusting of the aperture of the viewing/masking sector comprises: i) selecting the second or third touch-sensitive interactive zone respectively associated with the second or third radius indicating the lateral edge of the viewing/masking sector and ii) receiving angular movement of the selected second or third touch-sensitive interactive zone from the operator in order to adjust the aperture of the viewing/masking sector accordingly.

14. The method of claim 1, wherein the adjusting of the aperture of the viewing/masking sector comprises: i) selecting the first touch-sensitive interactive zone associated with the radius overlapping with the orientation of the central axis of the viewing/masking sector and the second or third touch-sensitive interactive zone associated with a corresponding radius indicating the corresponding lateral edge of the viewing/masking sector and ii) receiving relative angular movement of the selected touch-sensitive interactive zones from the operator in order to adjust the aperture of the viewing/masking sector accordingly.

15. The method of claim 1, wherein the adjusting of the aperture of the viewing/masking sector comprises: i) selecting the second and third touch-sensitive interactive zones associated with the radii overlapping with the lateral edges of the viewing/masking sector and ii) receiving relative angular movement of the second and third touch-sensitive interactive zones from the operator in order to adjust the aperture of the viewing/masking sector accordingly.

16. A device for adjusting parameters at least regarding an orientation and aperture of an angular viewing/masking sector of an environment scanning device, integrated into a mission system, and geocentered around the carrier of the environment scanning device, the device comprising a capability for carrying out the adjusting method according to claim 1.

17. An operator terminal of a mission system including at least one environment scanning device and one adjusting device according to claim 16.

18. The operator terminal of a mission system of claim 17, wherein the scanning device includes at least one element selected from the following:
a radar;
a camera; and
a detector.

19. The operator terminal of a mission system of claim 17, wherein the operator terminal is onboard a carrier selected from the following:
a stationary station;
a land vehicle;
a ship; and
an aircraft.

* * * * *